United States Patent
Barga

(10) Patent No.: US 9,557,502 B2
(45) Date of Patent: Jan. 31, 2017

(54) COMMUNICATION COUPLING INTERFACE

(71) Applicants: Allied Telesis Holdings Kabushiki Kaisha, Tokyo (JP); Allied Telesis, Inc., San Jose, CA (US)

(72) Inventor: Douglas D. Barga, Bellevue, WA (US)

(73) Assignees: Allied Telesis Holdings Kabushiki Kaisha, Tokyo (JP); Allied Telesis, Inc., San Jose, CA (US)

( * ) Notice: Subject to any disclaimer, the term of this patent is extended or adjusted under 35 U.S.C. 154(b) by 34 days.

(21) Appl. No.: 14/543,488

(22) Filed: Nov. 17, 2014

(65) Prior Publication Data

US 2016/0139352 A1    May 19, 2016

(51) Int. Cl.
| | |
|---|---|
| *H04B 10/00* | (2013.01) |
| *G02B 6/42* | (2006.01) |
| *H04J 14/00* | (2006.01) |
| *G02B 6/38* | (2006.01) |

(52) U.S. Cl.
CPC ............. *G02B 6/4278* (2013.01); *G02B 6/428* (2013.01); *G02B 6/3879* (2013.01)

(58) Field of Classification Search
CPC .................................. H04B 10/43; H04B 10/40
USPC ..................................................... 398/135–139
See application file for complete search history.

(56) References Cited

U.S. PATENT DOCUMENTS 6,469,906 B1 * 10/2002 Baltz .................... G02B 6/4201
174/359

* cited by examiner

*Primary Examiner* — Daniel Dobson
(74) *Attorney, Agent, or Firm* — Brooks Acordia IP Law, P.C.; Michael Zarrabian

(57) ABSTRACT

Systems, apparatuses, and devices for facilitating communication. An apparatus a first interface configured for coupling with a first pin pattern of an optical transceiver and a second interface configured for coupling with a second pin pattern of a printed circuit board. The apparatus is configured for communicatively coupling an optical transceiver having the first pin pattern with the second pin pattern of the printed circuit board.

18 Claims, 7 Drawing Sheets

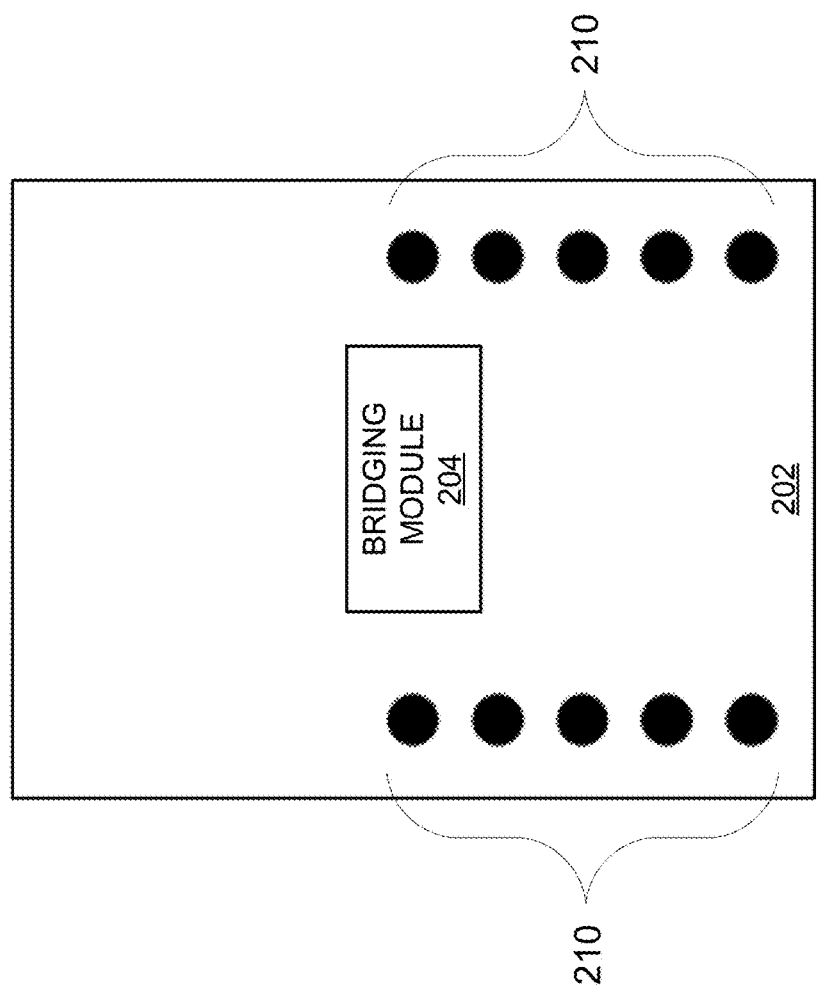

COMMUNICATION COUPLING INTERFACE

BACKGROUND

Various communication interfaces have been developed to meet increasing demands for increased density and higher speeds. With fiber optic technology, three fiber optic connectors of LC (Lucent connector), ST (straight tip), and SC (subscriber connector) have entered widespread use. While the transceivers for these connectors may have similar functions, the transceivers may have different sizes and different interfaces. For example, transceivers for SC and SC connectors may use a different pin pattern than a transceiver for an LC connector.

SUMMARY

A need has arisen for a solution that allows use of multiple transceivers with a single pin pattern. For example, the difference in pin patterns between SC and ST transceivers, and LC transceivers means that printed circuit boards pin patterns may be compatible with only one transceiver type.

Embodiments described herein allow the use of one or more transceiver types to be used with a single pin pattern of a printed circuit board. For example, an LC optical transceiver can be used with a two by five (2×5) pin pattern may be coupled to a one by nine (1×9) pin pattern. Embodiments may include an attachment that may be removable thereby allowing a variety of different transceivers to be used and interchanged. Embodiments may further include an LC transceiver coupled with an apparatus configured for coupling with a pin pattern for a SC or ST transceiver.

An embodiment is directed to an apparatus for facilitating communication. The apparatus includes a first interface configured for coupling with a first pin pattern of an optical transceiver and a second interface configured for coupling with a second pin pattern of a printed circuit board. The apparatus is configured for communicatively coupling an optical transceiver having the first pin pattern with the second pin pattern of the printed circuit board.

In some embodiments, the first pin pattern is a two by five pin pattern. In some embodiments, the second pin pattern is a one by nine pin pattern. In some embodiments, the apparatus is configured to translate communications received via the first interface. In some embodiments, the first pin pattern is configured for coupling of a Lucent connector (LC) optical transceiver. In some embodiments, the second pin pattern is configured for coupling of a subscriber connector (SC) optical transceiver. In some embodiments, the second pin pattern is configured for coupling of a straight tip (ST) optical transceiver.

Another embodiment is directed to a device for facilitating communication. The device includes an optical transceiver having a first interface and a circuit configured for coupling to a motherboard. The circuit comprises a second interface. The device further includes an adapter, which includes a first portion configured for coupling to the first interface and a second portion configured for coupling to the second interface. In some embodiments, the adapter is further configured to translate communications between the first and second interface. In some embodiments, the adapter comprises a processor configured to translate the communication between the first interface and the second interface. In some embodiments, the first interface is a two by five pin interface. In some embodiments, the second interface is a one by nine pin interface. In some embodiments, the optical transceiver is a Lucent connector (LC) optical transceiver. In some embodiments, the second interface is configured for coupling of a subscriber connector (SC) optical transceiver. In some embodiments, the second interface is configured for coupling of a straight tip (ST) optical transceiver.

Another embodiment is directed to a system for facilitating communication. The system includes a Lucent connector (LC) transceiver and a circuit board configured for coupling of a subscriber connector (SC) transceiver. The device further includes an adapter configured for communicatively coupling the LC transceiver to the circuit board. In some embodiments, the adapter is configured to translate communications received from the LC transceiver. In some embodiments, the circuit board is further configured for coupling of a straight connector (SC) transceiver. In some embodiments, the LC transceiver has a two by five pin pattern. In some embodiments, the circuit board has a one by nine pin pattern.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

FIGS. 2A-B show illustrative top and bottom views of an apparatus for coupling of a transceiver to a communication interface in accordance with some embodiments.

DETAILED DESCRIPTION

Figure 1:
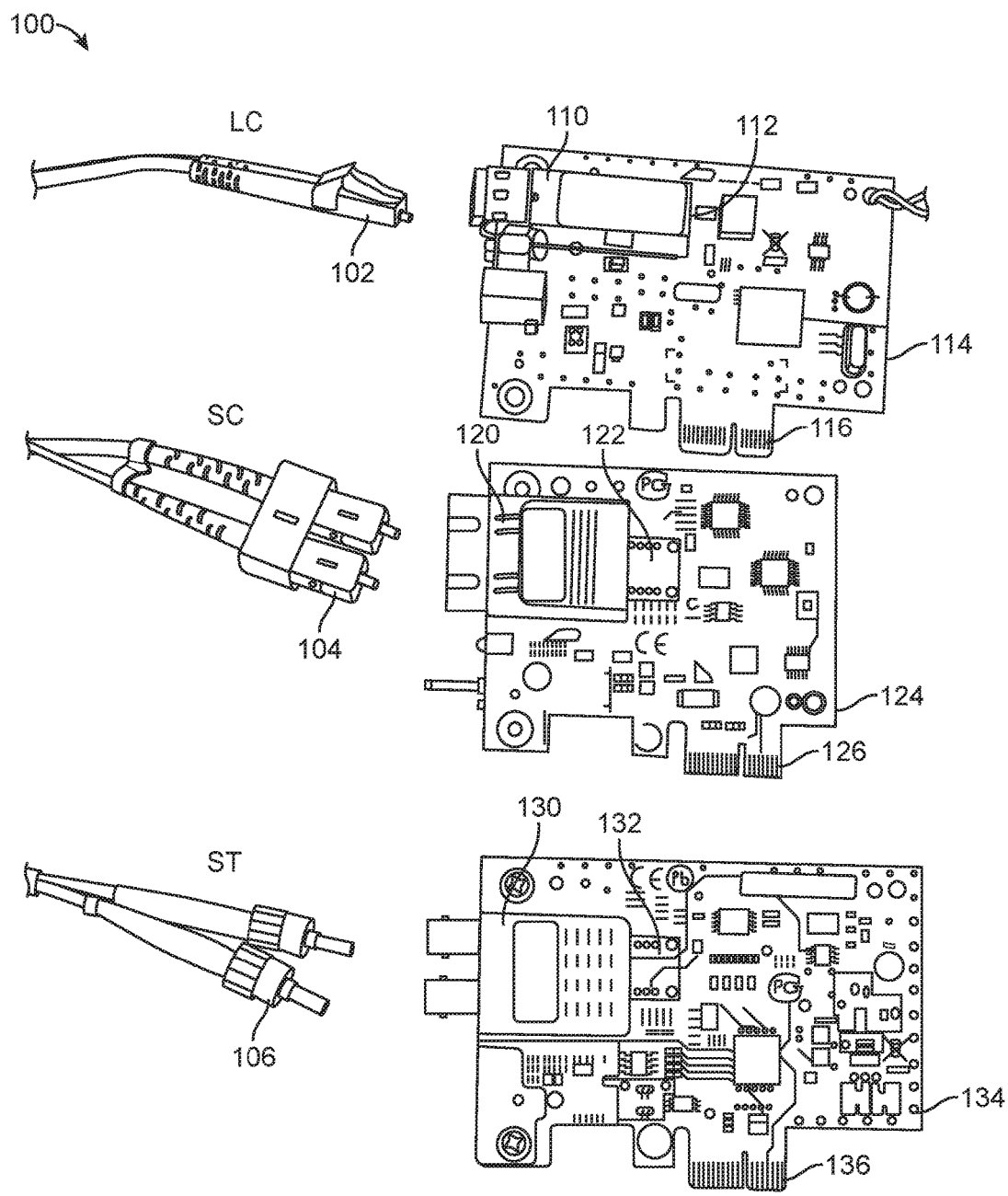
FIG. 1 shows illustrative communication connectors in accordance with some embodiments.

Reference will now be made in detail to various embodiments, examples of which are illustrated in the accompanying drawings. While the claimed embodiments will be described in conjunction with various embodiments, it will be understood that these various embodiments are not intended to limit the scope of the embodiments. On the contrary, the claimed embodiments are intended to cover alternatives, modifications, and equivalents, which may be included within the scope of the appended Claims. Furthermore, in the following detailed description of various embodiments, numerous specific details are set forth in order to provide a thorough understanding of the claimed embodiments. However, it will be evident to one of ordinary skill in the art that the claimed embodiments may be practiced without these specific details. In other instances, well known methods, procedures, components, and circuits have not been described in detail as not to unnecessarily obscure aspects of the claimed embodiments.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "converting," "transmitting," "storing," "determining," "sending," "querying," "providing," "accessing," "associating," "configuring," "initiating," "customizing", "mapping," "modifying," "generating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. In some embodiments, the present systems and methods can be implemented as hardware components, e.g., an application specific integrated circuit (ASIC), a field-programmable gate array (FPGA), complex programmable logic device (CPLD), a Programmable Array Logic (PAL) device, Generic Array Logic (GAL) device, embedded device, microcontroller, programmable device, etc. Some embodiments may include a computing device, a network device, etc. configured for implementing the present systems and methods. For example, some embodiments may be implemented as a router, a switch, etc. By way of example, and not limitation, computer-readable storage media may comprise computer storage media and communication media. Generally, program modules include routines, programs, objects, components, data structures, etc., that perform specific tasks or implement specific abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

A need has arisen for a solution that allows use of multiple transceivers with a single pin pattern. For example, the difference in pin patterns between SC and ST transceivers, and LC transceivers means that printed circuit boards pin patterns may be compatible with only one transceiver type.

Embodiments allow the use of one or more transceiver types to be used with a single pin pattern of a printed circuit board. For example, an LC optical transceiver can be used with a two by five (2×5) pin pattern may be coupled to a one by nine (1×9) pin pattern. Embodiments may be removable thereby allowing a variety of different transceivers to be used and interchanged. Embodiments may further include an LC transceiver coupled with an apparatus configured for coupling with a pin pattern for an SC or ST transceiver.

Various embodiments may be described with respect to LC, ST, and SC connectors and associated transceivers but embodiments are not limited thereto. For example, embodiments may be configured for operating with the various other connectors and transceivers. The descriptions of embodiments with respect to LC, ST, and SC connectors and associated transceivers are examples and are not intent to limit the scope of embodiments. It is noted that while embodiments, examples, etc., are described with respect to LC, ST, and SC connectors and associated transceivers, embodiments are not limited to LC, ST, and SC connectors and associated transceivers and embodiments may work with other connectors and transceivers.

FIG. 1 shows illustrative communication connectors in accordance with some embodiments. FIG. 1 depicts examples of connectors, transceivers, and printed circuit boards that may be used in connection with embodiments. Diagram 100 includes a LC connector 102, a LC transceiver 110, a transceiver coupling area 112, a printed circuit board 114, and a motherboard interface 116. The LC connector 102 is configured for coupling one or more fiber optic cables to the LC transceiver 110. In some embodiments, the LC transceiver 110 is configured for the receiving and sending fiber optical signals to and from network devices, computing devices, etc. The printed circuit board 114 includes the transceiver coupling area 112. The LC transceiver 110 is coupled to the transceiver coupling area 112 which may have a pin pattern configured for the communicative coupling of the LC transceiver 110 with one or more circuits on the printed circuit board 114. The printed circuit board 114 includes the motherboard interface 116, which is configured for coupling the printed circuit board 114 and configured for communicatively coupling of the transceiver 110 to a motherboard (not shown). In some embodiments, the LC transceiver 110 is configured for coupling with a two by five (2×5) pin pattern of printed circuit board 114.

Diagram 100 further includes an SC connector 104, an SC transceiver 120, a transceiver coupling area 122, a printed circuit board 124, and a motherboard interface 126. The SC connector 104 is configured for coupling one or more fiber optic cables to the SC transceiver 120. In some embodiments, the SC transceiver 120 is configured for the receiving and sending fiber optical signals to and from network devices, computing devices, etc. The printed circuit board 124 includes the transceiver coupling area 122. The SC transceiver 120 is coupled to the transceiver coupling area 122 which may have a pin pattern configured for the communicative coupling of the SC transceiver 120 with one or more circuits on the printed circuit board 124. The printed circuit board 124 includes the motherboard interface 126, which is configured for coupling the printed circuit board 124 and configured for communicatively coupling of the transceiver 120 to a motherboard (not shown). In some embodiments, the SC transceiver 120 is configured for coupling with a one by nine (1×9) pin pattern of the printed circuit board 124.

Diagram 100 further includes an ST connector 106, an ST transceiver 130, a transceiver coupling area 132, a printed circuit board 134, and a motherboard interface 136. The ST connector 106 is configured for coupling one or more fiber optic cables to the ST transceiver 130. In some embodiments, the ST transceiver 130 is configured for the receiving and sending fiber optical signals to and from network devices, computing devices, etc. The printed circuit board 134 includes transceiver coupling area 132. The ST transceiver 130 is coupled to transceiver coupling area 132, which may have a pin pattern configured for the communicative coupling of the ST transceiver 130 with one or more circuits on the printed circuit board 134. The printed circuit board 134 includes the motherboard interface 136, which is configured for coupling the printed circuit board 134 and configured for communicatively coupling of the transceiver 130 to a motherboard (not shown). In some embodiments, the ST transceiver 130 is configured for coupling with a one by nine (1×9) pin pattern of printed circuit board 134.

It is noted that the SC transceiver 120 and the ST transceiver 130 are wider than the LC transceiver 110. It is further noted that the SC transceiver 120 and the ST transceiver 130 are shorter than the LC transceiver 110.

Figure 2B:
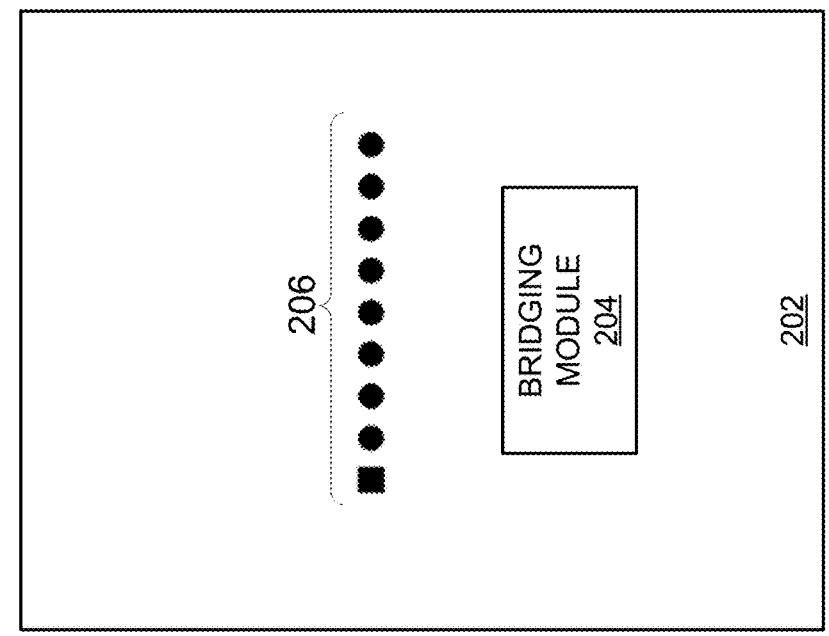

FIGS. 2A-B show illustrative top and bottom views of an apparatus for coupling of a transceiver to a communication interface in accordance with some embodiments. FIGS. 2A-B depicts a top and bottom view, respectively, of an apparatus configured to adapt, couple, bridge, etc., a transceiver configured for coupling with a first pin pattern (e.g., 2×5) to be coupled to a printed circuit board having a second pin pattern (e.g., 1×9).

Diagram 200 includes an apparatus 202 which is configured for communicatively coupling a transceiver configured for coupling with a first pin pattern (e.g., 2×5) to be coupled to a printed circuit board having a second pin pattern (e.g., 1×9). FIG. 2A shows a top view of the apparatus 202. The apparatus 202 includes a bridging module 204 and an interface 210. The interface 210 is an example interface and embodiments may have an interface, pin pattern, etc., different than shown and are not limited to the interface, pin pattern, etc., shown. In some embodiments, the interface 210 is a two by five (2×5) pin pattern configured for coupling to an LC optical transceiver. Bridging module 204 is configured for bridging, translating, etc., signals received via the interface 210 to another interface (e.g., interface 206). The bridging module 204 may be embedded, integrated, etc. inside of apparatus 202.

FIG. 2B shows a bottom view of the apparatus 202. The apparatus 202 further includes an interface 206. The interface 206 is an example interface and embodiments may have an interface, pin pattern, etc., different than shown and are not limited to the interface, pin pattern, etc., shown. In some embodiments, the interface 206 is a one by nine (1×9) pin pattern configured for coupling to a printed circuit board. The printed circuit board may be configured for coupling to a SC or ST optical transceiver. The apparatus 202 thereby allows the coupling of an LC optical transceiver printed circuit board configured for coupling to an SC or ST optical transceiver.

Figure 3:
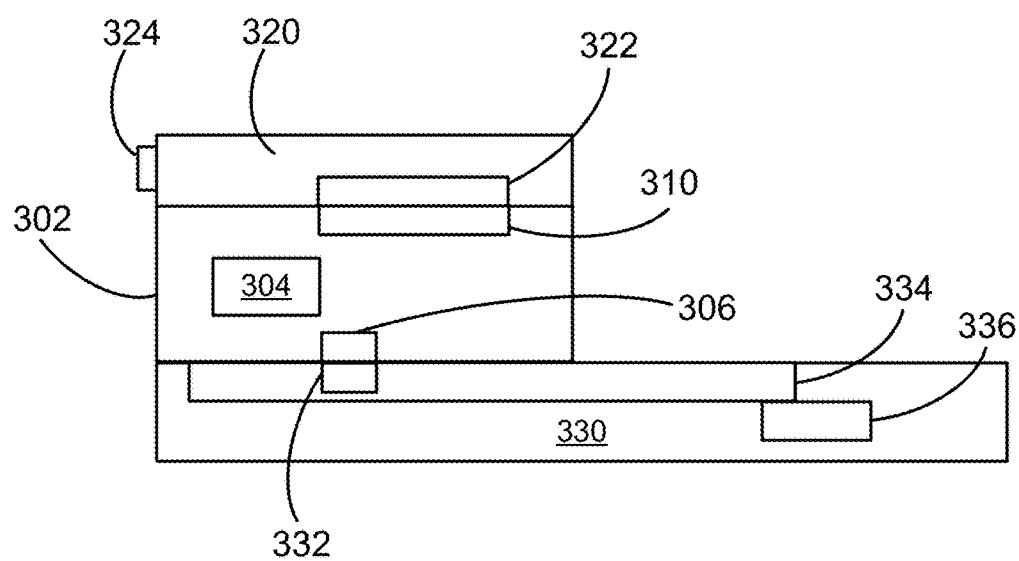
FIG. 3 shows an illustrative side view of an apparatus for coupling of a transceiver to a communication interface coupled to a printed circuit board in accordance with some embodiments.

FIG. 3 shows an illustrative side view of an apparatus for coupling of a transceiver to a communication interface coupled to a printed circuit board in accordance with some embodiments. FIG. 3 depicts a system or device 300 including an optical transceiver 320 coupled to a printed circuit board 330 with an apparatus 302 configured for communicatively coupling the optical transceiver 320 and the printed circuit board 330. The optical transceiver 320 includes a communication interface 324 and an interface 322. In some embodiments, the optical transceiver 320 is an LC optical transceiver. In some embodiments, the communication interface 324 is configured for coupling of fiber optic cables or fiber optic media cables, which may allow the optical transceiver 320 to communicate with network equipment external to a computer system. The interface 322 is configured for coupling the optical transceiver 320 to a printed circuit board having an associated interface that matches interface 322. In some embodiments, the interface 322 has a two by five (2×5) pin pattern.

The apparatus 302 includes a bridging module 304, an interface 306, and an interface 310. The bridging module 304 is configured for bridging, translating, etc., signals between the interface 306 and the interface 310. In some embodiments, the bridging module 304 is substantially similar to bridging module 204. In some embodiments, the interface 306 is substantially similar to the interface 206 and the interface 310 is substantially similar to the interface 210. In some embodiments, the interface 310 is configured for coupling to a two by five (2×5) pin pattern (e.g., of an optical transceiver). In some embodiments, the interface 306 is configured for coupling to a one by nine (1×9) pin pattern (e.g., of a printed circuit board). The interface 310 is communicatively coupled to the interface 322. In some embodiments, the apparatus 302 is configured for removably coupling with the optical transceiver 320 and the printed circuit board 330.

The printed circuit board 330 includes an interface 332, a circuit 334, and a motherboard interface 336. The interface 332 is coupled to the interface 306 and communicatively couples the circuit 334 to the apparatus 302. The interface 332 is configured for coupling of an optical transceiver. In some embodiments, the interface 332 is configured for coupling to an SC or ST optical transceiver. In some embodiments, the interface 332 has a one by nine (1×9) pin pattern. The circuit 334 is configured for bridging, translating, etc., signals received from the interface 332 to the motherboard interface 336.

The motherboard interface 336 is coupled to the circuit 334. The motherboard interface 336 is configured for coupling the printed circuit board 330 and the circuit 334 to a motherboard (not shown). The motherboard interface 336 is further configured for communicatively coupling the printed circuit board 330 to the motherboard and configured to provide power from the motherboard to the printed circuit board 330 and the circuit 334. In some embodiments, the motherboard interface 336 may be substantially similar to motherboard interfaces 116, 126, and 136. In some embodiments, the motherboard interface 336 is a PCI express interface, a mini PCI express interface, etc.

In some embodiments, the apparatus (e.g., apparatus 302) includes a first interface (e.g., the interface 310) configured for coupling with a first pin pattern (e.g., a two by five (2×5) pin pattern) of an optical transceiver (e.g., the optical transceiver 320) and a second interface (e.g., the interface 306) configured for coupling with a second pin pattern (e.g., a one by nine (1×9) pin pattern) of a printed circuit board (e.g., the printed circuit board 330). In some embodiments, the first pin pattern is configured for coupling of an LC optical transceiver. In some embodiments, the second pin pattern is configured for coupling of an SC optical transceiver. In some embodiments, the second pin pattern is configured for coupling of an ST optical transceiver. In some embodiments, the apparatus is configured for communicatively coupling an optical transceiver having the first pin pattern with the second pin pattern of the printed circuit board. In some embodiments, the apparatus is configured to translate communications received via the first interface.

In some embodiments, a device (e.g., device 300) includes an optical transceiver (e.g., the optical transceiver 320) having a first interface (e.g., the interface 322) and a circuit (e.g., the circuit 334) configured for coupling to a motherboard. The circuit comprises a second interface (e.g., the interface 332). An adapter (e.g., the apparatus 302) includes a first portion (e.g., the interface 310) configured for coupling to the first interface and a second portion (e.g., the interface 306) configured for coupling to the second interface. In some embodiments, the adapter is further configured to translate communications between the first and second interface. In some embodiments, the adapter comprises a processor configured to translate the communication between the first interface and the second interface. In some embodiments, the first interface is a two by five (2×5) pin interface. In some embodiments, the second interface is a one by nine (1×9) pin interface. In some embodiments, the optical transceiver is an LC optical transceiver. In some embodiments, the second interface is configured for coupling of an SC optical transceiver. In some embodiments, the second interface is configured for coupling of an ST optical transceiver.

In some embodiments, a system includes an LC transceiver (e.g., the optical transceiver 320) and a circuit board (e.g., printed circuit board 330) configured for coupling of a SC transceiver. The system further includes an adapter (e.g., the apparatus 302) configured for communicatively coupling the LC transceiver to the circuit board. In some embodiments, the adapter is configured to translate communications received from the LC transceiver. In some embodiments, the circuit board is further configured for coupling of a SC transceiver. In some embodiments, the LC transceiver has a two by five pin pattern. In some embodiments, the circuit board has a one by nine (1×9) pin pattern.

It is appreciated that in some embodiments, the interface 310 of the apparatus 302 matches the interface 322 of the optical transceiver 320. It is further appreciated that in some embodiments, the interface 306 of the apparatus 302 matches the interface 332 of circuit 334.

Figure 4:
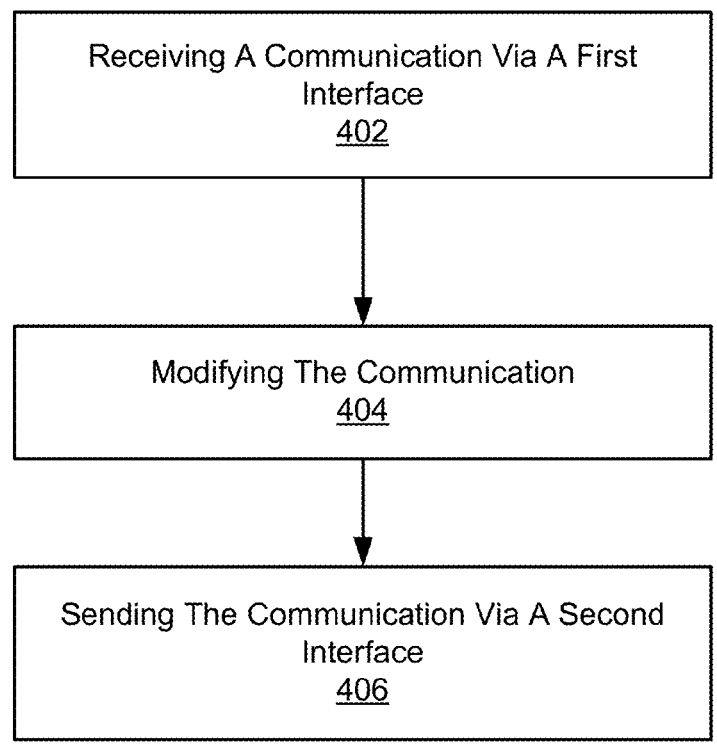
FIG. 4 shows a flow diagram of a process for handling communications in accordance with some embodiments.

FIG. 4 shows a flow diagram of a process for handling communications in accordance with some embodiments. FIG. 4 depicts a process 400 for bridging, translating, etc., signals between an optical transceiver (e.g., the optical transceiver 320) and a printed circuit board (e.g., the printed circuit board 330). It is appreciated that communication handling between an optical transceiver and the printed circuit board is for illustrative purposes and should not be construed as limiting the scope of the embodiments. For example, the communication handling may be between any two interfaces where the two interfaces are different from one another.

At block 402, a communication is received via a first interface. In some embodiments, a communication is received from an optical transceiver having a first pin pattern (e.g., two by five (2×5)) coupled to the first interface (e.g., the interface 310) of an apparatus (e.g., the apparatus 302).

At block 404, the received communication is modified. In some embodiments, the apparatus is configured to modify the communication for being sent out over another interface. For example, the apparatus is configured to modify the communication received via a two by five (2×5) pin pattern to be sent out via one by nine pin pattern. In some embodiments, the modification of the communication includes bridging, translating, etc., the communication for sending out over a second interface, as described herein.

At block 406, the communication is sent via the second interface. In some embodiments, the modified communication is sent out over a one by nine (1×9) pin pattern. It is noted that embodiments further support communications and associated modification of communications that are received via a one by nine (1×9) pin patterns and sent out over two by five (2×5) pin patterns.

Figure 5:
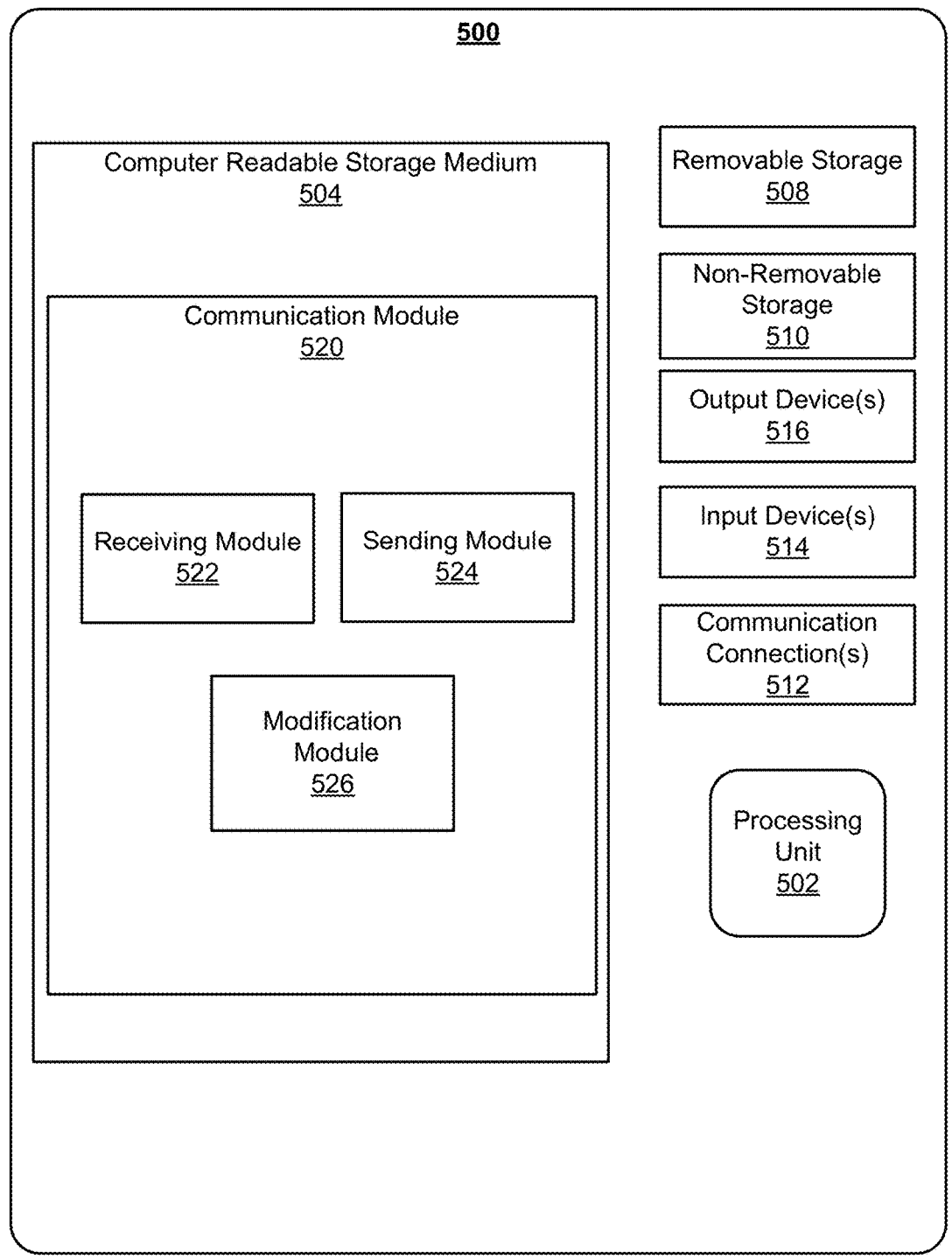
FIG. 5 shows a block diagram of a computer system in accordance with some embodiments.

Referring now to FIG. 5, a block diagram of a computer system in accordance with some embodiments is shown. With reference to FIG. 5, an example system module for implementing embodiments disclosed above, such as the embodiments described in FIGS. 1-4. In some embodiments, the system includes a general purpose computing system environment, such as computing system environment 500. The computing system environment 500 may include, but is not limited to, servers, desktop computers, laptops, tablets, mobile devices, and smartphones. In its most basic configuration, the computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed may perform name resolution and mapping functions to allow internal or private networks to use network addresses outside of private or internal network address ranges as specified by a network protocol.

Additionally in various embodiments, the computing system environment 500 may also have other features/functionality. For example, the computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and nonremovable storage 510 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by the computing system environment 500. Any such computer storage media may be part of the computing system environment 500.

In some embodiments, the computing system environment 500 may also contain communications connection(s) 512 that allow it to communicate with other devices. Communications connection(s) 512 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Communications connection(s) 512 may allow the computing system environment 500 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that the communication connection(s) 512 connect to may run a plurality of network protocols including, but not limited to, transmission control protocol (TCP), user datagram protocol (UDP), Internet Protocol (IP), real-time transport protocol (RTP), real-time transport control protocol (RTCP), file transfer protocol (FTP), and hypertext transfer protocol (HTTP).

In further embodiments, the computing system environment 500 may also have input device(s) 514 such as keyboard, mouse, a terminal or terminal emulator (either directly connected or remotely accessible via telnet, SSH, HTTP, SSL, etc.), pen, voice input device, touch input device, remote control, etc. Output device(s) 2016 such as a display, a terminal or terminal emulator (either directly connected or remotely accessible via telnet, SSH, HTTP, SSL, etc.), speakers, LEDs, etc. may also be included.

In some embodiments, the computer readable storage medium 504 includes a communication module 520. The communication module 520 is configured for sending, receiving, and translating communication between a first interface (e.g., associated with an optical transceiver) and a second interface (e.g., associated with a printed circuit board). The communication module 520 includes a receiving module 522, a sending module 524, and a modification module 526. In some embodiments, the communication module 520 is configured for facilitating communication between an LC optical transceiver having a two by five pin pattern (2×5) and a circuit having a one by nine pin pattern (1×9).

The receiving module 522 is configured for receiving communications from a first interface and a second interface, as described herein. In some embodiments, the first interface is associated with an optical transceiver and the second interface is associated with a printed circuit board. In some embodiments, the receiving module 522 sends the communications to the modification module 526. The modification module 526 is configured for bridging, translating, etc., the communications for sending, as described herein. In some embodiments, the modification module 526 modifies communications received from a first interface to be sent out with a second interface. The sending module 524 is configured for sending of communications. In some embodiments, the sending module 524 sends modified communications out via a second interface, as described herein.

Figure 6:
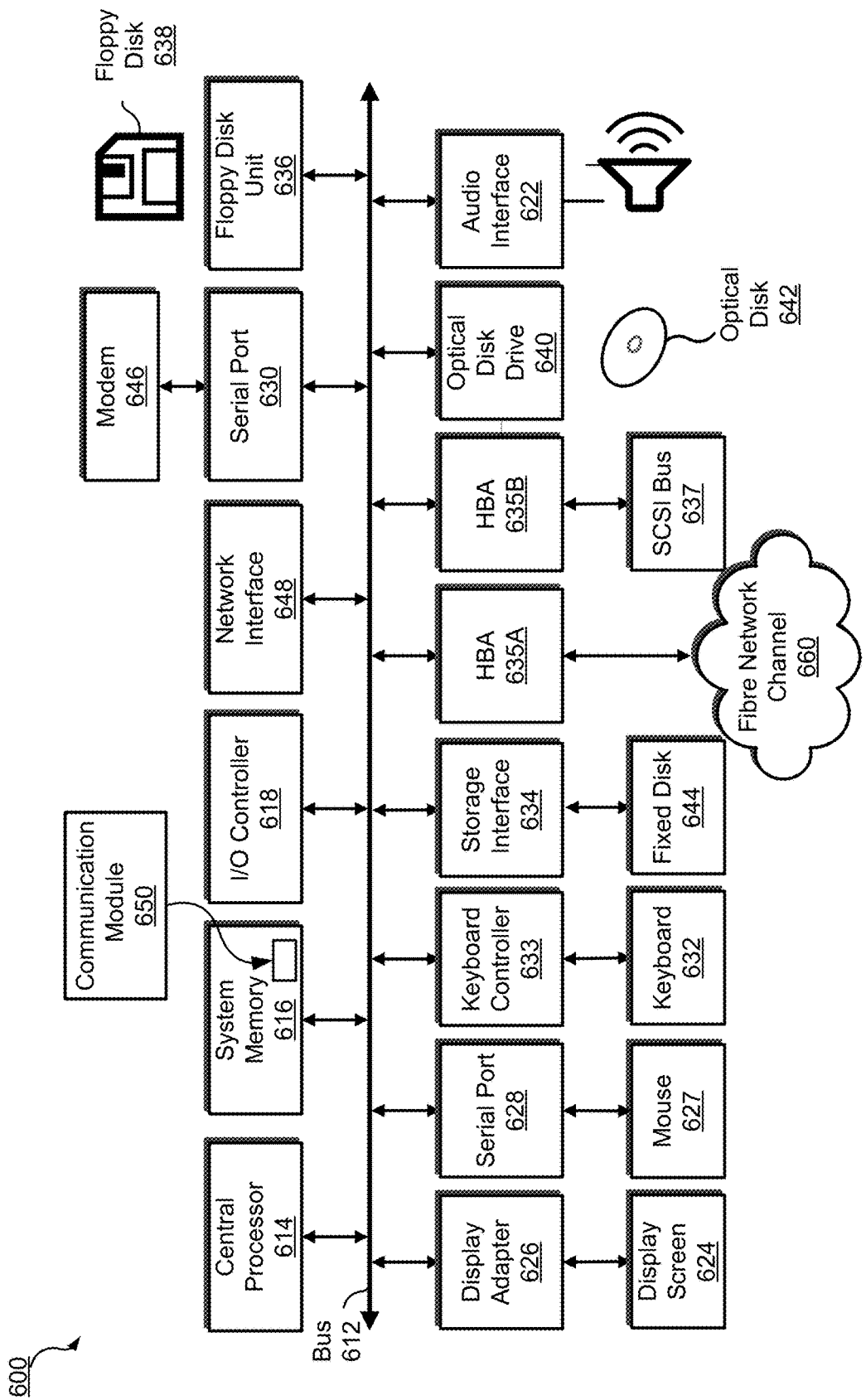
FIG. 6 shows a block diagram of another computer system in accordance with some embodiments.

Referring now to FIG. 6, a block diagram of another computer system in accordance with some embodiments is shown. FIG. 6 depicts a block diagram of a computer system 600 suitable for implementing the present disclosure. Computer system 600 includes a bus 612 which connects the major subsystems of the computer system 600, such as a central processor 614, a system memory 616 (typically RAM, but which may also include ROM, flash RAM, or the like), an input/output controller 618, an external audio device, such as a speaker system 620 via an audio output interface 622, an external device, such as a display screen 624 via a display adapter 626, serial ports 628 and 630, a keyboard 632 (interfaced with a keyboard controller 633), a storage interface 634, a floppy disk drive 636 operative to receive a floppy disk 638, a host bus adapter (HBA) interface card 635A operative to connect with a Fibre Channel network 660, a host bus adapter (HBA) interface card 635B operative to connect to a Small Computer System Interface (SCSI) bus 637, and an optical disk drive 640 operative to receive an optical disk 642. Also included are a mouse 627 (or other point-and-click device, coupled to bus 612 via serial port 628), a modem 646 (coupled to bus 612 via serial port 630), and a network interface 648 (coupled directly to bus 612).

It is appreciated that the network interface 648 may include one or more Ethernet ports, wireless local area network (WLAN) interfaces, etc., but is not limited thereto. System memory 616 includes a communication module 650, which is configured for sending, receiving, and translating communication between a first interface (e.g., associated with an optical transceiver) and a second interface (e.g., associated with a printed circuit board), as described herein.

According to some embodiments, the communication module 650 may include other modules for carrying out various tasks (e.g., modules of FIG. 5). It is appreciated that the communication module 650 may be located anywhere in the system and is not limited to the system memory 616. As such, residing within the system memory 616 is merely an example and not intended to limit the scope of the embodiments. For example, parts of the communication module 650 may be located within the central processor 614 and/or the network interface 648 but are not limited thereto.

The bus 612 allows data communication between the central processor 614 and the system memory 616, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 600 are generally stored on and accessed via a computer readable medium, such as a hard disk drive (e.g., fixed disk 644), an optical drive (e.g., optical drive 640), a floppy disk unit 636, or other storage medium.

Additionally, applications can be in the form of electronic signals modulated in accordance with the application and data communication technology when accessed via network modem 646 or network interface 648.

The storage interface 634, as with the other storage interfaces of computer system 600, can connect to a standard computer readable medium for storage and/or retrieval of information, such as a fixed disk drive 644. A fixed disk drive 644 may be a part of computer system 600 or may be separate and accessed through other interface systems. The network interface 648 may provide multiple connections to networked devices. Furthermore, a modem 646 may provide a direct connection to a remote server via a telephone link or to the Internet via an Internet service provider (ISP). The network interface 648 provides one or more connections to a data network, which may consist of any number of other network-connected devices. The network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, not all of the devices shown in FIG. 6 need to be present to practice the present disclosure. The devices and subsystems can be interconnected in different ways than shown in FIG. 6. Code to implement the present disclosure can be stored in computer-readable storage media such as one or more of system memory 616, fixed disk 644, optical disk 642, or floppy disk 638. The operating system provided on computer system 600 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

What is claimed is:

1. An apparatus comprising:
  a first interface configured for coupling with a first pin pattern to an optical transceiver;
  a second interface configured for coupling with a second pin pattern to a printed circuit board, wherein the first interface and the second interface are configured to communicatively couple the optical transceiver having the first pin pattern with the second pin pattern of the printed circuit board; and
  an adapter, wherein the adapter is configured to translate communications between the first and second interface, and wherein the adapter comprises a processor configured to translate the communication between the first interface and the second interface.

2. The apparatus as described in claim 1, wherein the first pin pattern is a two by five pin pattern.

3. The apparatus as described in claim 1, wherein the second pin pattern is a one by nine pin pattern.

4. The apparatus as described in claim 1 further comprising a module configured to translate communications received via the first interface.

5. The apparatus as described in claim 1, wherein the first pin pattern is configured for coupling to a Lucent connector (LC) optical transceiver.

6. The apparatus as described in claim 1, wherein the second pin pattern is configured for coupling to a subscriber connector (SC) optical transceiver.

7. The apparatus as described in claim 1, wherein the second pin pattern is configured for coupling to a straight tip (ST) optical transceiver.

8. A device comprising:
  an optical transceiver having a first interface;
  a circuit configured for coupling to a motherboard, wherein the circuit comprises a second interface; and
  an adapter comprising:
    a first portion configured for coupling to the first interface; and
    a second portion configured for coupling to the second interface;
    wherein the adapter is further configured to translate communications between the first and second interface, and wherein the adapter comprises a processor configured to translate the communication between the first interface and the second interface.

9. The device of claim 8, wherein the first interface is a two by five pin interface.

10. The device of claim 8, wherein the second interface is a one by nine pin interface.

11. The device of claim 8, wherein the optical transceiver is a Lucent connector (LC) optical transceiver.

12. The device of claim 8, wherein the second interface is configured for coupling to a subscriber connector (SC) optical transceiver.

13. The device of claim 8, wherein the second interface is configured for coupling to a straight tip (ST) optical transceiver.

14. A system comprising:
  a Lucent connector (LC) transceiver having a first interface;
  a circuit board configured for coupling to a subscriber connector (SC) transceiver, wherein the circuit board comprises a second interface; and
  an adapter configured for communicatively coupling the LC transceiver to the circuit board, wherein the adapter is further configured to translate communications between the first and second interface, and wherein the adapter comprises a processor configured to translate the communication between the first interface and the second interface.

15. The system of claim 14, wherein the adapter is configured to translate communications received from the LC transceiver.

16. The system of claim 14, wherein the circuit board is further configured for coupling to a straight connector (SC) transceiver.

17. The system of claim 14, wherein the LC transceiver has a two by five pin pattern.

18. The system of claim 14, wherein the circuit board has a one by nine pin pattern.

* * * * *